(12) United States Patent
Paquet et al.

(10) Patent No.: US 8,589,317 B2
(45) Date of Patent: Nov. 19, 2013

(54) HUMAN-ASSISTED TRAINING OF AUTOMATED CLASSIFIERS

(75) Inventors: Ulrich Paquet, Cambridge (GB); David Stern, Cambridge (GB); Jurgen Anne Francois Marie Van Gael, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/970,158

(22) Filed: Dec. 16, 2010

(65) Prior Publication Data

US 2012/0158620 A1 Jun. 21, 2012

(51) Int. Cl.
*G06F 15/18* (2006.01)

(52) U.S. Cl.
USPC .......................................................... 706/12

(58) Field of Classification Search
USPC ...................................................... 706/12, 62
See application file for complete search history.

(56) References Cited

U.S. PATENT DOCUMENTS

| | | | |
|---|---|---|---|
| 6,751,600 B1 | 6/2004 | Wolin | |
| 7,155,157 B2 * | 12/2006 | Kaplan | 434/350 |
| 7,263,486 B1 * | 8/2007 | Hakkani-Tur et al. | 704/243 |
| 7,742,918 B1 * | 6/2010 | Hakkani-Tur et al. | 704/245 |
| 2006/0294101 A1 | 12/2006 | Wnek | |
| 2007/0183655 A1 | 8/2007 | Konig et al. | |
| 2008/0004864 A1 | 1/2008 | Gabrilovich et al. | |

OTHER PUBLICATIONS

Tur et al, "Active learning for spoken language understanding", Proceedings, 2003 IEEE International Conference on Acoustics, Speech, and Signal Processing, 2003, (ICASSP '03), Date of Conference: Apr. 6-10, 2003, vol. 1, pp. I-276-I-279, vol. 1.*
Tur et al, "Combining active and semi-supervised learning for spoken language understanding", Received Mar. 2, 2004; accepted Aug. 30, 2004, Speech Communication 45 (2005) 171-186.*
Li et al, "Confidence-Based Active Learning", IEEE Transactions on Pattern Analysis and Machine Intelligence, vol. 28, No. 8, Aug. 2006.*
Roth et al, "Margin-based Active Learning for Structured Output Spaces", ECML '06, Proceedings of t he 17th European conference on Machine Learning pp. 413-424, 2006 Article.*
Seo et al, "A Reinforcement Learning Agent for Personalized Information Filtering", IUI, 2000, New Orleans, LA USA.*
Zoeter et al, "A Decision Theoretic Framework for Implicit Relevance Feedback", NIPS 2007 Workshop, Dec. 7, 2007.*

(Continued)

*Primary Examiner* — Jeffrey A Gaffin
*Assistant Examiner* — Ilya Traktovenko
(74) *Attorney, Agent, or Firm* — Microsoft Corporation

(57) ABSTRACT

Many computing scenarios involve the classification of content items within one or more categories. The content item set may be too large for humans to classify, but an automated classifier (e.g., an artificial neural network) may not be able to classify all content items with acceptable accuracy. Instead, the automated classifier may calculate a classification confidence while classifying respective content items. Content items having a low classification confidence may be sent to a human classifier, and may be added, along with the categories identified by the human classifier, to a training set. The automated classifier may then be retrained using the training set, thereby incrementally improving the classification confidence of the automated classifier while conserving the involvement of human classifiers. Additionally, human classifiers may be rewarded for classifying the content items, and the costs of such rewards may be considered while selecting content items for the training set.

20 Claims, 10 Drawing Sheets

(56) References Cited

OTHER PUBLICATIONS

Yang; et al., "Effective Multi-Label Active Learning for Text Classification"—Published Date: Jun. 28-Jul. 1, 2009 http://research.microsoft.com/pubs/81064/sigkdd09-yang.pdf.

Sebastiani, Fabrizio, "Machine Learning in Automated Text Categorization"—Published Date: Mar. 2002, ACM Computing Surveys, vol. 34, No. 1, http://nmis.isti.cnr.it/sebastiani/Publications/ACMCS02.pdf.

Kannan; et al., "Similarity-Based Techniques for Text Document Classification"—Published Date: 2008, International Journal of Soft Computing 3 (1): 58-62, http://docsdrive.com/pdfs/medwelljournals/ijscomp/2008/58-62.pdf.

Vidhya; et al., "A Survey of Naïve Bayes Machine Learning approach in Text Document Classification"—Published Date: Mar. 9, 2010, http://arxiv.org/ftp/arxiv/papers/1003/1003.1795.pdf.

Lawrence; et al., "Fast Sparse Gaussian Process Methods: The Informative Vector Machine", Retrieved Sep. 27, 2010, http://research.microsoft.com/apps/pubs/default.aspx?id=76038.

MacKay, David J.C., "Bayesian Methods for Adaptive Models", Published: 1992, http://www.inference.phy.cam.ac.uk/mackay/01.06.contents.ps.gz.

\* cited by examiner

130

```
SET BUFFER SIZE N
INITIALIZE AUTOMATED CLASSIFIER:
    F(I, C) = P(CATEGORY = TRUE | I, C) ∈ [0,1]
INITIALIZE PRIOR P(C)
LOOP:
    SET TRAINING SET T = ∅
    WHILE | T | < N :
        FOR NEXT CONTENT ITEM I:
            COMPUTE P_C(F(I,C))
            COMPUTE CLASSIFICATION CONFIDENCE:
                C(P_C(F(I,C)))
            IF (C(P_C(F(I,C))) < CONFIDENCE THRESHOLD):
                TRAINING SET T ← T ∪ I
                REDUCE TRAINING BUDGET B BY COST OF
                    HUMAN CLASSIFICATION OF I
    SEND TRAINING SET T TO HUMAN CLASSIFIERS
    RECEIVE CLASSIFICATIONS (C ∈ I?)
    TRAIN AUTOMATED CLASSIFIER
    COMPUTE AUTOMATED CLASSIFIER CONFIDENCE
WHILE
    ((AUTOMATED CLASSIFIER CONFIDENCE < ACCEPTABLE LIMIT) AND
    (TRAINING BUDGET B > 0))
```

FIG. 10

HUMAN-ASSISTED TRAINING OF AUTOMATED CLASSIFIERS

BACKGROUND

Within the field of art, many scenarios involve a task of classifying content items into one or more categories, such as identifying topics discussed in a message or document; objects present in an image; or a musical genre associated with a musical recording. These classification tasks may be performed by humans, e.g., by presenting the content items to users and receiving the categories identified by the users. These classification tasks may also be performed by an automated classifier, e.g., a Bayesian classification network or artificial neural network that is trained to classify content items into categories. This training is often performed, e.g., using a sample data set, such as a set of content items for which one or more categories have been previously identified. For example, an artificial neural network may be provided a set of content items for which the associated categories are known, and may therefore adjust the weights of the interconnections among the neurons in order to achieve a correct classification of the content items of the training set into the known categories. The artificial neural network, once trained, may be invoked to classify additional content items.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As compared with the use of humans to classify a particular set of content items, the use of artificial classifiers may be advantageous, e.g., for classifying content items of larger data sets than may be feasibly classified by humans, and/or for classifying unknown or difficult-to-classify content items based on the classification principles inherent in the known content items of the training set. In such scenarios, the use of humans to perform the classification tasks may not be feasible (e.g., the number of content items may simply be too large to be classified by humans, or such classification may be too expensive) and/or inconsistent (e.g., human classification may be inconsistent or unpredictable for difficult-to-classify content items).

However, the classification results generated by an artificial classifier may be unacceptably low, e.g., if the artificial classifier is presented with content items that are significantly different from those presented in the training set; if new categories are developed; and/or if the logic generated by the training of the artificial neural network happens to be sufficient to classify the content items of the training set, but is insufficient for classifying other content items. Such inadequacies may be ameliorated through retraining of the artificial classifier, but such retraining often involves the intervention and careful attention of a developer or administrator of the artificial classifier (e.g., the selection of a new training set, the application of the training regimen, and the testing of the retrained artificial classifier).

Presented herein are techniques for training artificial classifiers to classify content items with the involvement of human classifiers. These techniques utilize the capabilities of the human classifiers to develop the automated classifier in order to improve the accurate classification of content items. However, the involvement of human classifiers is typically expensive (e.g., involving the presentation of a payment or other reward to the human classifiers for their time and skill in performing the classification, or simply because the amount of classification that may be performed by such human classifiers is finite and limited). Therefore, these techniques are devised to reduce the involvement of the human classifiers in the development of the automated classifier, and/or to apply the capabilities of such human classifiers to the development of the automated classifier in a manner that maximizes the improvement of the accuracy of the automated classifier.

In accordance with these techniques, the automated classifier may be invoked to classify content items of a content set (e.g., topics discussed in various documents or messages, objects visible in various images, or musical genres associated with various musical recordings). However, for each classification, the automated classifier may also calculate a classification confidence, e.g., the reliability of the classification. For example, the automated classifier may identify some content items with calculably high reliability (e.g., content items that closely resemble a content item in the training set for which categories are known), but may identify other content items with calculably low reliability (e.g., content items that are highly dissimilar to many content items in the training set, or for which the classification of content items in the training set are inconsistent). Content items having a low classification confidence may be selected and provided to human classifiers, who may identify one or more categories that are associated with the content item. These human-selected classifications of content items may therefore be utilized as a new training set to retrain the automated classifier in order to achieve an accurate classification of the difficult-to-classify content items. Therefore, human involvement may be applied to improve the areas of classification where the automated classifier is demonstrably weak, and may therefore achieve a rapid improvement of the accuracy of the automated classifier with minimal human involvement.

Additional variations of these techniques relate to the presentation to human classifiers of a reward (e.g., payment of cash or valuable credit) for the classification of content items. In these variations, the selection of content items may be adjusted to reduce the costs entailed by utilizing the human classifiers. As a first such variation, the selection of content items for classification by human classifiers (in order to develop a new training set for the automated classifier) may be restricted to satisfy a budget constraint, such as a total amount of cash that may be allocated for the involvement of human classifiers. As a second such variation, different content items may involve different rewards based on the complexity of the classification (e.g., a first document may be longer, more complex, or more difficult to classify than a second document, and may therefore involve a larger reward for human classification), and the selection of content items may be adjusted to prioritize lower-cost content items over higher-cost content items. These and other considerations relating to the payment of rewards to human classifiers are discussed as optional variations of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 10 is an illustration of an exemplary algorithm for training an automated classifier, using a training set comprising associations of selected content items with categories by human classifiers, in accordance with the techniques presented herein.

DETAILED DESCRIPTION

Figure 1:
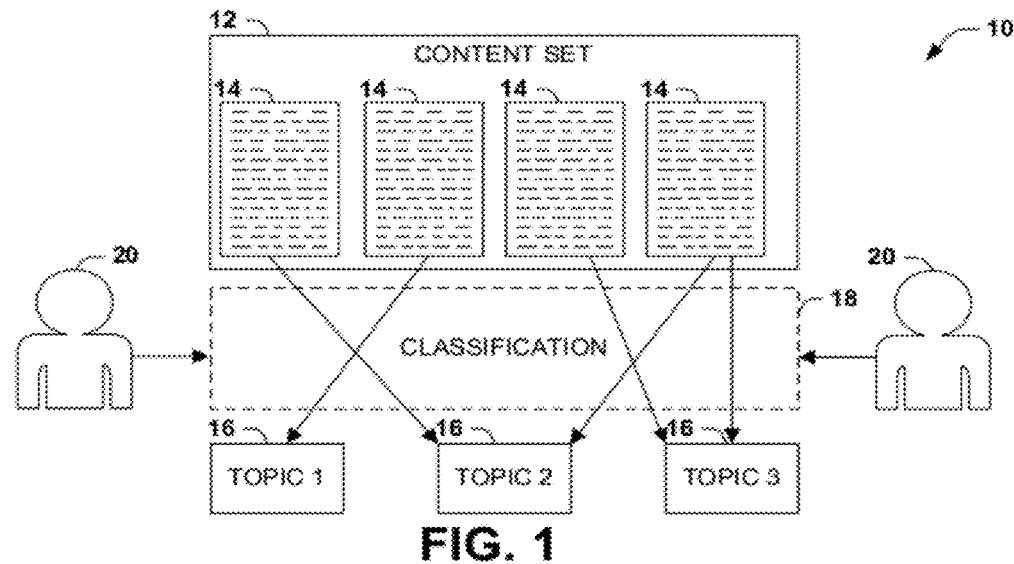
FIG. 1 presents an illustration of an exemplary scenario featuring a classification of content items by human classifiers.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a classification of content items into one or more categories. As a first example, a set of documents may be received that may fall into various categories of literature, such as news items, scientific or technical reports, fictional or nonfictional stories, poetry, and reference documents, and/or may be written in one or more languages. These documents may be classified by evaluating the writing style of the document (e.g., based on vocabulary, document length, sentence length and complexity, and formatting). As a second example, a set of messages may be received that may discuss one or more topics, such as particular individuals, organizations, locations, events, or concepts. These messages may be classified by evaluating the content of each message (e.g., based on keyword analysis and semantic evaluation, such as the identification of proper nouns based on capitalization). As a third example, a set of images may depict various objects that may be identified according to various machine vision algorithms. These images may be classified by evaluating various properties of the identified objects (e.g., based on biometric measurements that may identify particular individuals). As a fourth example, a set of musical recordings may be classified into one or more musical genres (e.g., based on tempo, time signature, identified instruments, and musical structure). In these and many other examples, a classification is applied to associate a set of content items with a set of categories.

Figure 2:
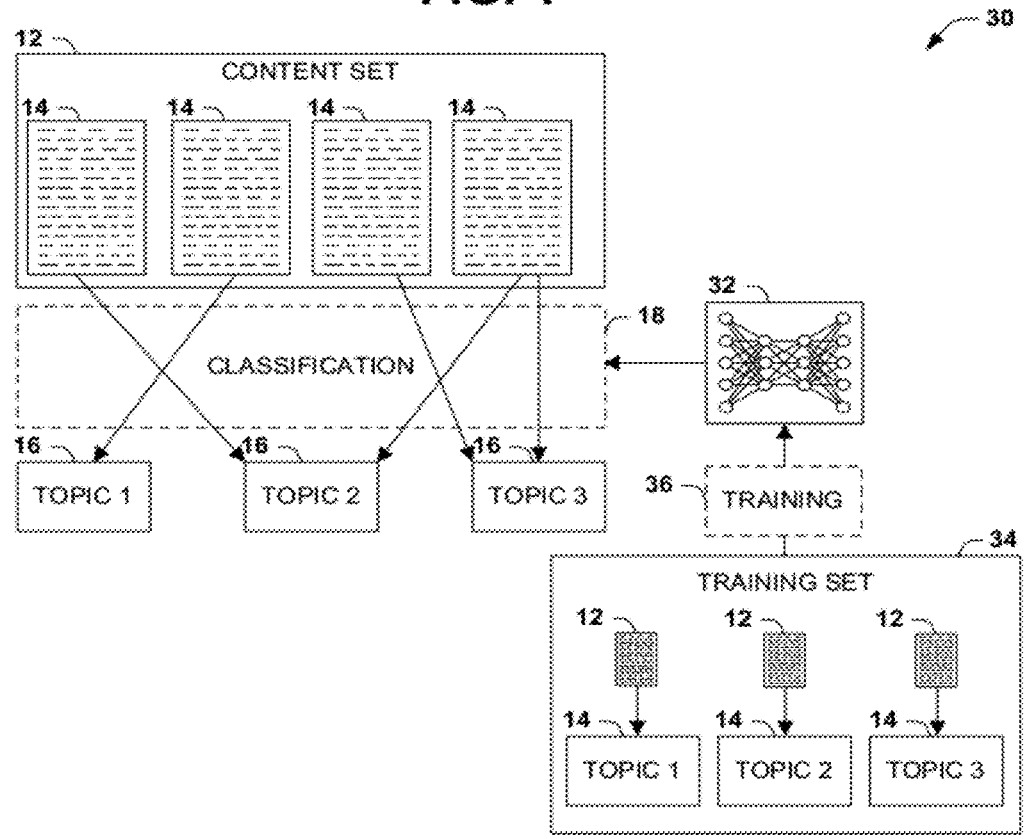
FIG. 2 presents an illustration of an exemplary scenario featuring a classification of content items by an automated classifier.

FIGS. 1 and 2 present two alternative scenarios involving a content set 12 comprising one or more content items 14 that is evaluated for classification into one or more categories 16. For example, the content set 14 may comprise a set of documents, and the categories 16 may comprise various topics that may be discussed in such documents. FIG. 1 an illustration of an exemplary scenario 10 featuring a first such technique that involves the use of human classifiers 20 to perform the classification 18, which is occasionally identified as a "Mechanical Turk" solution. In this exemplary scenario 10, the classification 18 of the content items 14 into one or more categories 16 is performed by one or more human classifiers 20, e.g., by presenting respective documents to a human classifier, along with a set of topics that the human classifier 20 may select if the content items 14 is found to relate to the topic. A computer (such as a server) may capture the categories 16 selected by one or more human classifiers 20 in relation to each content item 14, and may use the results of this classification 18 in various ways (e.g., by allowing users to search for documents associated with a particular topic).

FIG. 2 presents a second exemplary scenario 30 involving a classification 18 of content items 14 into one or more categories 16 (such as documents associated with one or more topics) using an automated classifier 32, such as an artificial neural network, a Bayesian classifier algorithm, an expert system, a genetically synthesized classifier, or a combination of such techniques. In many of these techniques, the automated classifier 32 is developed using a training set 34, comprising a set of content items 14 for which an authoritative and reliable classification 18 into one or more categories 16 is known. The training set 34 may be generated, e.g., by a human classifier 20 (e.g., a developer or administrator of the automated classifier 32) who may prepare the training set 34 using an appropriate set of content items 14 and associated categories 16, and/or by utilizing a sample content set 12 prepared by another automated classifier 32. The training set 34 may be utilized to perform a training 36 of the automated classifier 32 until the automated classifier 32 is capable of identifying, within an acceptable range of accuracy, the categories 16 associated with the content items 14 of the training set 34. As a first example, an automated neural network may incrementally adjust the weights of various interconnections among its neurons until the output neurons are capable of generating a correct output (identifying one or more categories 16) for each content item 14 based on a set of characteristics provided to each input neuron. As a second example, a Bayesian network may iteratively evaluate the set of content items 14 in the training set 34 to identify, according to statistical analyses, the properties that classify each content item 14 differentially among two or more subsets of categories 16, and may develop a hierarchy of differentiating factors that correctly pigeonholes each content item 14 into one or more categories 16. As a third example, a genetic algorithm may generate a set of entities that logically classify the content items 14 of the training set 34, and may competitively test, compare, and breed (with mutations) the logical instructions comprising each entity for a consecutive set of generations, with an adaptive pressure that selects the most accurate entities in each generation, until an entity that is capable of correctly classifying the content items 14 of the training set 34 with an acceptable range of accuracy is identified. These and other "machine learning" techniques, including combinations of such techniques, may be utilized and trained to generate an acceptably accurate artificial classifier 32, which may then be utilized to perform a classification 18 of the content items 14 of the content set 12 into one or more categories 16.

Each of the alternative solutions of FIGS. 1 and 2 may present comparative advantages and comparative disadvantages. A "Mechanical Turk" solution may be disadvantageous in some scenarios, wherein a classification 18 of all content items 14 performed by human classifiers 20 may be infeasible, inefficient, or inaccurate. As a first example, the set of content items 14 may be too voluminous to be classified entirely by human classifiers 20. For example, a classification 18 of messages posted within a social network into one or more topics may be desired, but the rate whereby such messages are submitted may considerably outpace the rate at which human classifiers 20 may be utilized to classify such messages. As a second example, while a set of human classifiers 20 may be available to classify the content items 14 of a content set 12, it may simply be inefficient to rely on the human classifiers 20 to do so; e.g., automated classifiers 32 may be developed and utilized to achieve an equivalently accurate classification 18 at a lower cost. As a third example, some content items 14 in the content set 12 may be difficult to classify (e.g., it may be desirable to choose only one category 16 for each content item 14, but some content items 14 may appropriately fall within several categories 16), and human classifiers 20 may yield an undesirable range of inconsistent or variable associations with respective categories 16 for one or more content items 14, while an automated classifier 32 may consistently classify such content items 14 in a more consistent manner. For example, while classifying a musical recording that spans several musical genres, different human classifiers 20 may classify the musical recording into different musical genres, and even a single human classifier 20 may vary in the selection of musical genres over time, but an automated classifier 32 may compare the musical recording with a set of statistical characteristics representing each musical genre, and may logically and consistently choose the musical genre having the highest statistical characterization of the musical recording. In these and other scenarios, the use of automated classifiers 32 to perform the classification 18 may be more feasible, efficient, and/or accurate than the use of human classifiers 20.

However, automated classification may also be undesirable in various scenarios. As a first example, some content sets 12 may involve a classification 18 that is simply too nuanced, complex, subjective, or ill-defined to produce consistent results via automated classification, such as the persuasiveness of a logical argument or the artistic skill of an artist evidenced by a painting. As a second example, the development of an automated classifier 32 that correctly identifies a large body of content items 14 may be difficult to achieve without significant human intervention. For example, the process of training an artificial neural network involves a particular degree of randomness, and many such neural networks may be generated that may, within an acceptable range of accuracy, classify the content items 14 of a training set 34. However, when presented with new content items 12 that are not in the training set 34, a first automated classifier 32 trained in this manner may correctly classify the new content items 12, but a second automated classifier 32 trained in this manner and embodying a different logical process than the first automated classifier 32 may classify the new content items 12 with a much lower degree of accuracy. Therefore, a significant amount of monitoring and tweaking of the automated classifier 32 by a developer or administrator may be involved to promote and maintain the accuracy of the automated classifier 32.

In view of the potential inadequacies of these exemplary scenarios, it may be appreciated that hybrid techniques, utilizing a combination of automated and human classification, may yield more accurate and consistent results. However, it may be difficult to devise hybrid techniques that harness both the scalability and consistency of automated classifiers 32 and the more sophisticated and nuanced logic of human classifiers 20. Additionally, it may be desirable to devise a hybrid technique that conserves the attention of human classifiers 20, which may be more expensive, more scarce, and/or less scalable than reliance on automated classifiers 32.

Presented herein are techniques for a hybrid classification of content items 14 involving an automated classifier 32 that may be adjusted by invoking the classification decisions of human classifiers 20. According to these techniques, it may be possible for an automated classifier 32 to differentiate content items 14 for which a classification into one or more categories 16 may be identified as having a high degree of classification confidence, and content items 14 for which the classification into one or more categories 16 may be identified as having a lower degree of classification confidence. In contrast with the former content items 14, the latter set of content items 14 may identify an area of classification 18 in which the automated classifier 32 is weak, inconsistent, or uninformed.

Figure 3:
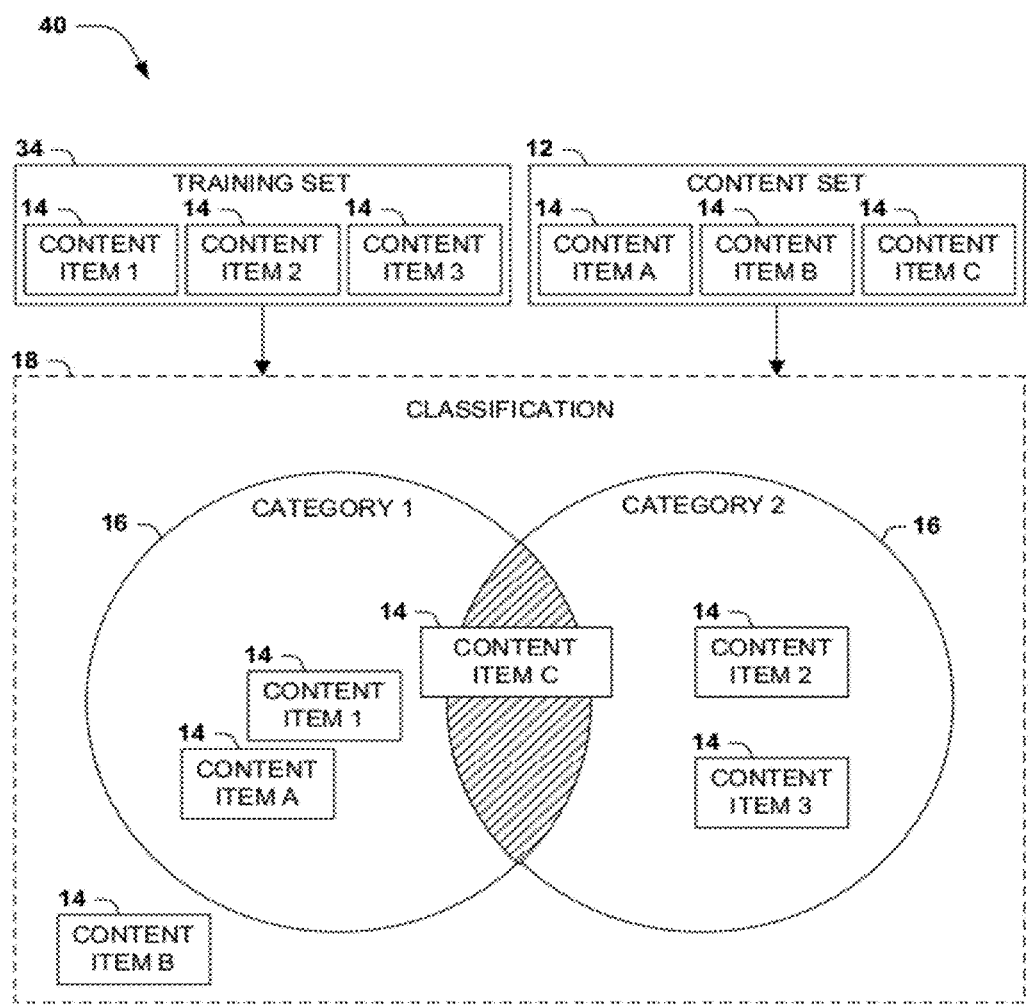
FIG. 3 presents an illustration of an exemplary set of categories and content items that may be classified within such categories.

FIG. 3 presents an exemplary scenario 40 featuring a classification 18 of content items 14 of a content set 12 into two categories 18. In this exemplary scenario 40, the two categories 18 are mutually exclusive (e.g., classifying a set of stories as fictional or non-fictional). An automated classifier 32 may have been developed to classify such content items 14 using a training set 34, comprising a set of content items 14 (identified by numerals, e.g., "content item 1") for which categories 16 have been definitively identified, such that the first content item 14 is definitively classified within the first category 16 and the second and third content items 14 are definitively classified within the second category 16. In view of such training, the automated classifier 32 may then endeavor to classify a set of content items 14 of a content set 12 (identified by letters, e.g., "content item A"). The first content item 14 is very similar to a content item 14 of the training set 34, and thus may be classified within the first category 16 with a high degree of classification confidence. However, the second content item 14 of the content set 12 may be dissimilar to any of the content items 14 in the training set 34, and while the automated classifier 32 may be capable of classifying the content item 14 into one or more categories 16, the classification confidence of such classification 18 may be comparatively low. Additionally, the third content item 14 may be a borderline case (e.g., potentially falling within either category 16), and while the automated classifier 32 may be capable of classifying the content item 14 into one category 16 over the other category 16, the classification confidence may again be comparatively low. The automated classifier 32 may therefore calculate a classification confidence for the classification 18 of various content items 14 of the content set 12 (e.g., the degree of similarity of the content item 14 with one or more content items 14 of the training set 32, and/or the magnitude of difference between the classification 18 with the selected categories 16 and the non-classification with the non-selected categories 16).

In order to improve the weakness in the capabilities of an automated classifier 32 in classifying such content items 14, an embodiment of these techniques may rely upon human classifiers 20 to supplement and improve such capabilities. For example, for content items 14 having a low classification confidence (e.g., a calculated metric that falls below a classification confidence threshold), the embodiment may send such content items 14 to one or more human classifiers 20 for classification 18. The results of such human-mediated classification 18 may be utilized as a training set 34, and the automated classifier 32 may be retrained using this training set 34. At the completion of the training 36 using these content items 14, the automated classifier 32 may exhibit additional strength and improved classification confidence in these former areas of weakness. Additional instances of retraining may be performed to achieve additional improvements in other areas of classification 18, until the automated classifier 32 is capable of classifying content items 14 within the entire scope of the content set 12 with an acceptable classification confidence and accuracy.

Figure 4:
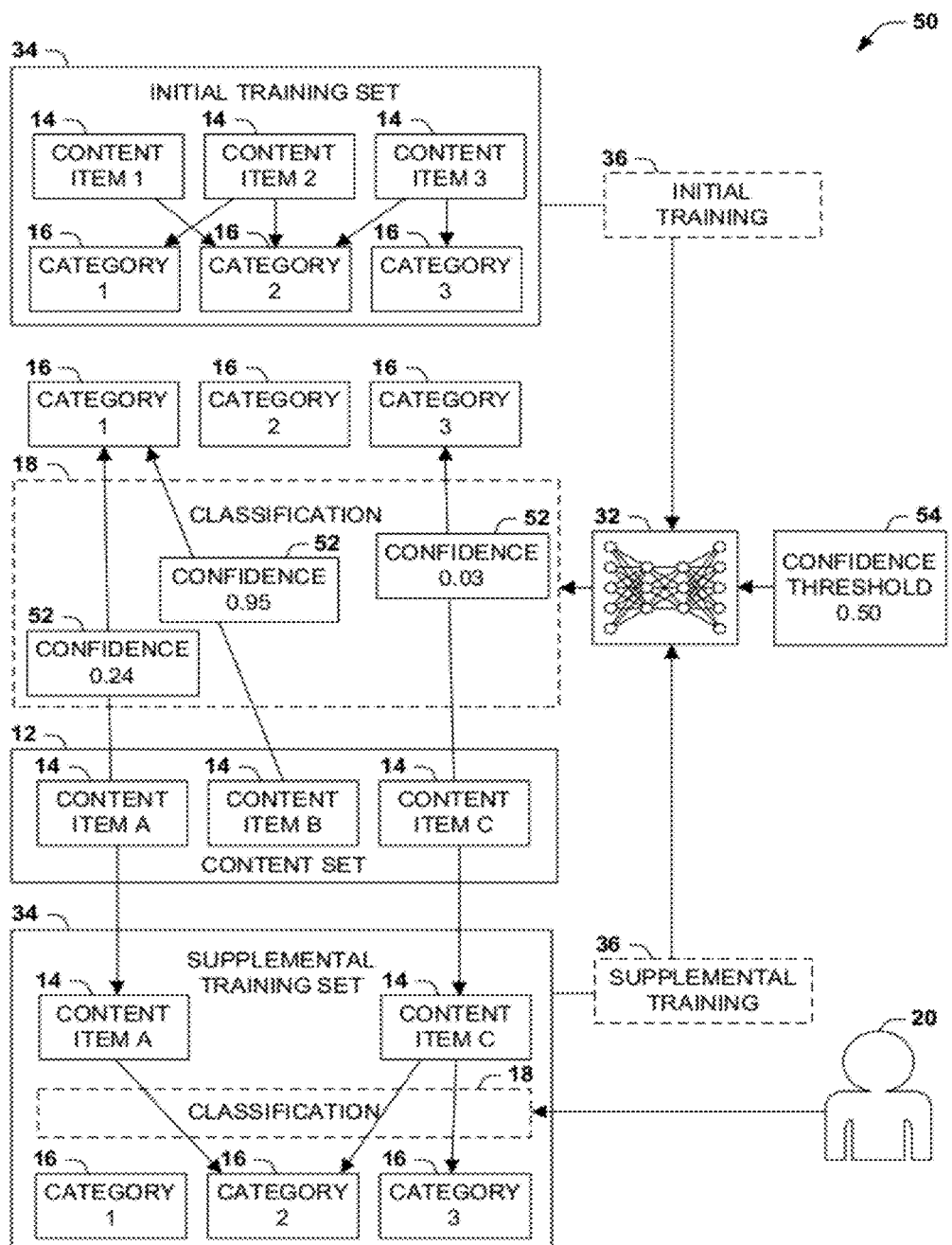
FIG. 4 presents an illustration of an exemplary scenario featuring a training of an automated classifier to classify content items according to the techniques presented herein.

FIG. 4 presents an exemplary scenario 50 featuring a classification 18 of content items 18 utilizing a hybrid of human classifiers 20 and automated classifiers 32 in accordance with the techniques presented herein. In this exemplary scenario 50, an automated classifier 32 is provided that is capable of classifying content items 14 into one or more categories 16. For example, the automated classifier 32 may comprise an artificial neural network may be initialized through a training 36 involving an initial training set 34, such as a set of exemplary or archetypal content items 14 and definitively identified categories 16 associated therewith. Alternatively, the automated classifier 32 may comprise other automated learning techniques, and may be not be initialized, but may simply be randomized (e.g., by seeding the weights of neuronal synapses with random values). The automated classifier 32 may be invoked to perform a classification 18 of content items 14 of a content set 12 (such as the three content items 14 identified in this exemplary scenario 50 as "A", "B", and "C"), and each classification 18 may result in an identified association with one or more categories 16, and also a classification confidence 52 (e.g., computed as a probability between 0.00, indicating no confidence, and 1.00, indicating absolute confidence). An embodiment of these techniques may compare the classification confidence 52 of each classification 18 with a classification confidence threshold 54 (e.g., a 0.50 probability) that distinguishes acceptably confident classifications 18 from unacceptably confident classifications 18. For example, the content item 14 identified as "B" may be classified with a classification confidence 52 of 0.96 that well exceeds a defined classification confidence threshold 54 of 0.50, while the content items 14 identified as "A" and "C" may be classified with unacceptably low classification confidences 52 of 0.24 and 0.03. Accordingly, an embodiment of these techniques may select these content items 14 for inclusion in a supplemental training set 34, and may provide this training set 34 to a human classifier 20 for classification 18. After the human classifier 20 identifies one or more categories 16 associated with each content item 14, these associations may be used in a supplemental training 36 in order to improve the proficiency of the automated classifier 32 in classifying these types of content items 14. (The supplemental training 36 may either include or omit the content items 14 from the initial training set 34, and/or from previously generated supplemental training sets 34.) In this manner, the supplementally trained automated classifier 32 may therefore exhibit a wider range of acceptably accurate classifications 18. Moreover, this supplemental training 36 may be achieved with a conservative involvement of the human classifier 20, thereby achieving a highly efficient use of human resources in improving the proficiency of the automated classifier 32.

Figure 5:
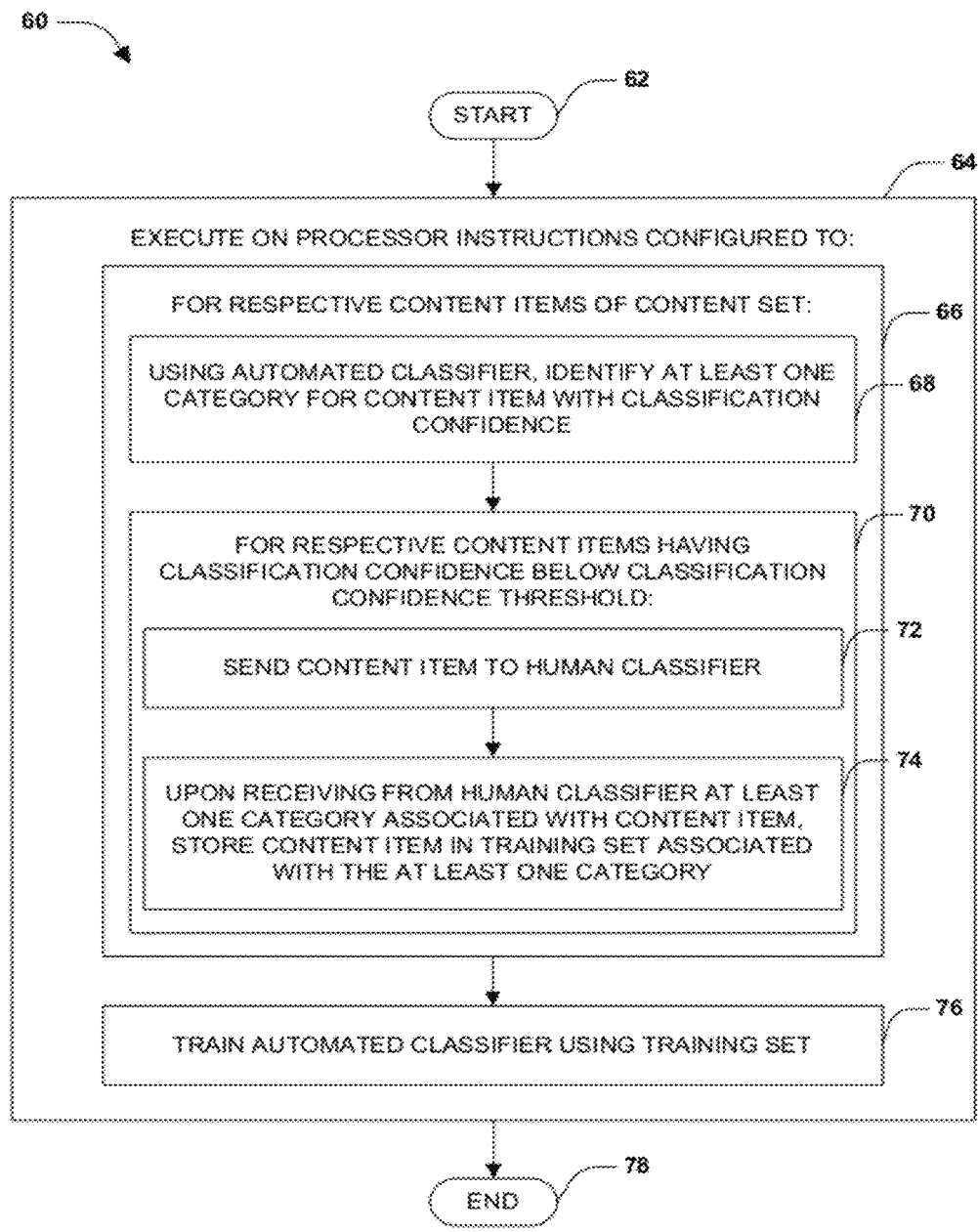
FIG. 5 is a flow chart illustrating an exemplary method of training an automated classifier to classify content items.

FIG. 5 presents a first embodiment of these techniques, illustrated as an exemplary method 60 of training an automated classifier 32 to identify categories 16 of content items 14. The exemplary method 60 may be implemented, e.g., as a set of software instructions stored in a memory component (e.g., a memory circuit, a platter of a hard disk drive, a solid-state storage device, or a magnetically or optically encoded disc) of a device having (in addition to the automated classifier 32) a processor, a content set 12 comprising content items 14, and access to at least one human classifier 20, where the instructions are configured to, when executed by the processor, cause the device to perform the techniques presented herein. The exemplary method 60 begins at 62 and involves executing 64 the instructions on the processor. In particular, the instructions are configured to, for respective 66 content items 14 of the content set 12, using the automated classifier 32, identify 68 at least one category 16 for the content item 14 with a classification confidence 52. The instructions are also configured to, for respective 70 content items 14 having a classification confidence 52 below a classification confidence threshold 54, send 72 the content item 14 to a human classifier 20, and upon receiving from the human classifier 20 at least one category 16 associated with the content item 14, store 74 the content item 14 in a training set 34 associated with the at least one category 16. The instructions are also configured to train 74 the automated classifier 32 using the training set 34. In this manner, the exemplary method 60 achieves the training of the automated classifier 32 to classify content items 14 within one or more categories 16, and so ends at 76.

Figure 6:
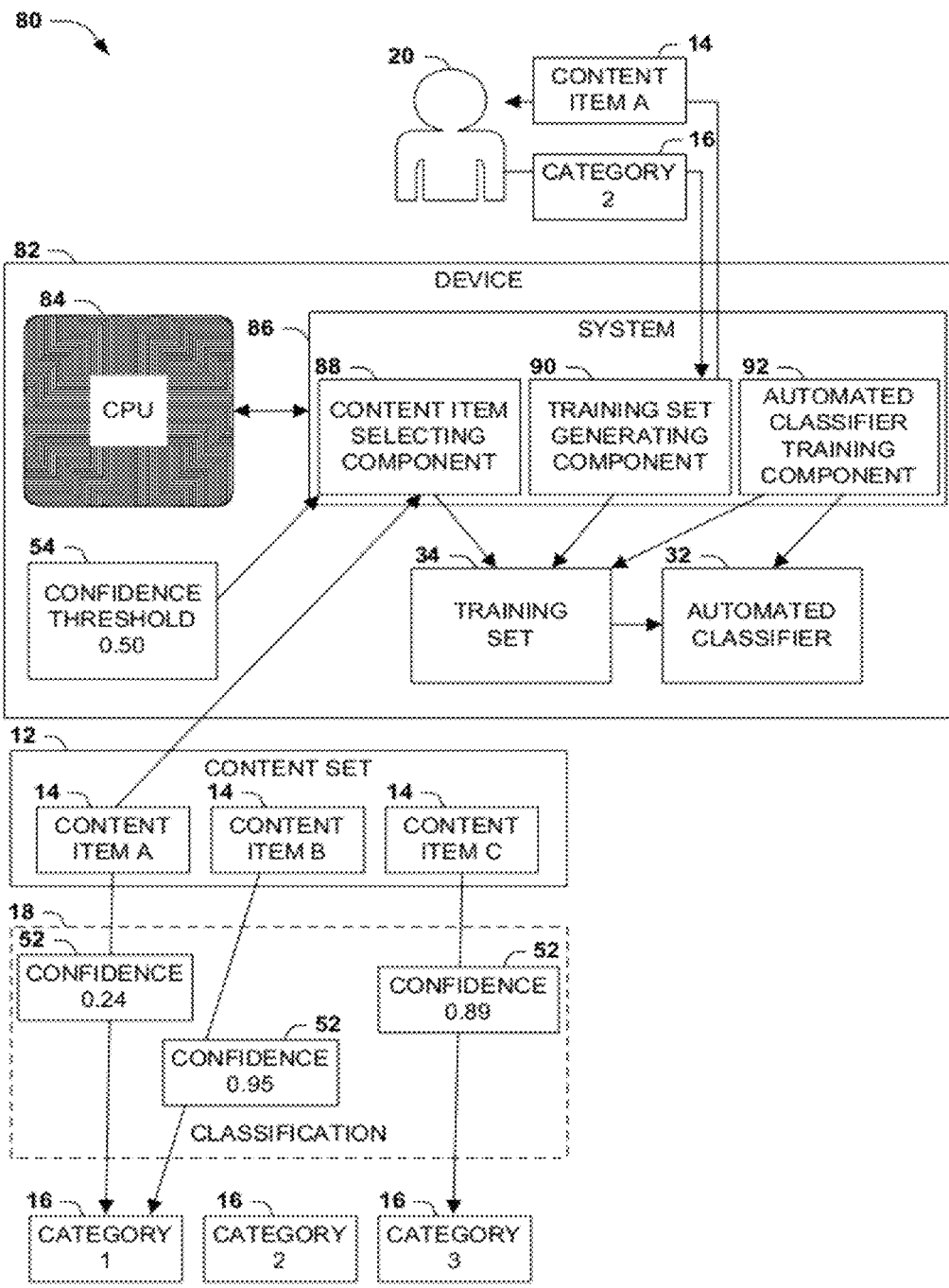
FIG. 6 is a component block diagram illustrating an exemplary system for training an automated classifier to classify content items.

FIG. 6 presents a second embodiment of these techniques, illustrated as an exemplary system 86 configured to train an automated classifier 32 to identify categories 16 of content items 14 of a content set 12. The exemplary system 86 operates within a device 82 having one or more processors 84, and having access to one or more human classifiers 20. The exemplary system 86 may therefore be implemented as a software architecture, e.g., a set of software components, each comprising a set of instructions stored on a memory component (e.g., a memory circuit, a platter of a hard disk drive, a solid-state storage device, or a magnetically or optically encoded disc) of the device 82, that, when respectively executed on the processor 84, cause the device 28 to perform one or more tasks associated with the techniques presented herein. Through the interoperation (through concurrent and/or consecutive execution on the one or more processors 84) of the identified components, the exemplary system 86 may cause the device 82 to perform all of the tasks of the techniques presented herein. The exemplary system 86 may comprise a content item selecting component 88, which is configured to, for respective content items 14 of the content set 12, use the automated classifier 32 to identify at least one category 16 for the content item 14 with a classification confidence 52, and to select content items 14 having a classification confidence 52 below a classification confidence threshold 54 defined by the device 82. The exemplary system 86 may also comprise a training set generating component 90, which is configured to send the selected content items 14 to a human classifier 20, and upon receiving from the human classifier 20 at least one category 16 associated with the content item 14, store the content item 14 in a training set 34 associated with the at least one category 16. The exemplary system 86 also includes an automated classifier training component 92, which is configured to train the automated classifier 32 using the training set 34. By implementing this set of components that cause the processor 84 to perform the tasks specified herein, the components of the exemplary system 86 therefore interoperate to cause the device 82 to perform the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
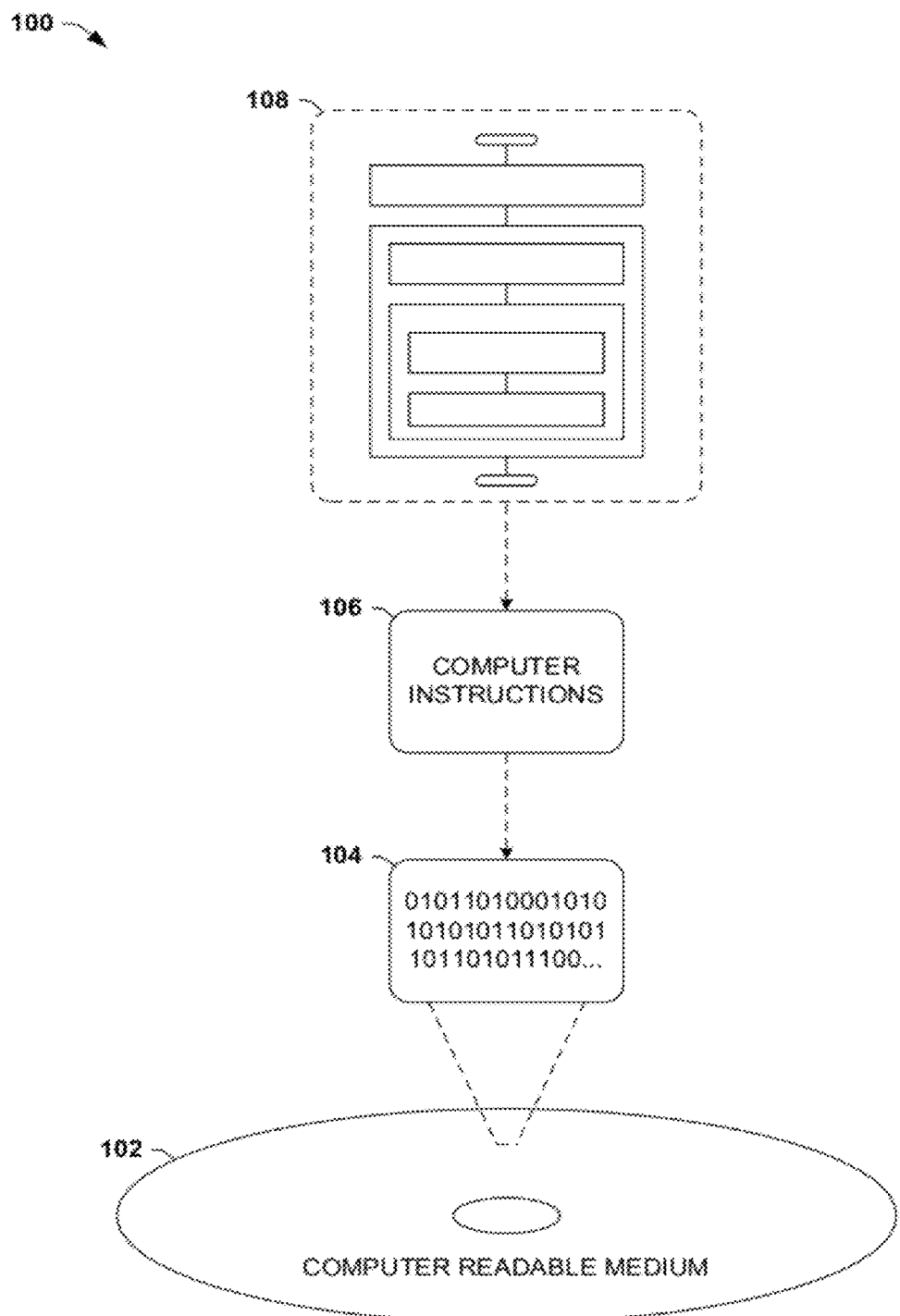
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of training an automated classifier to classify content items, such as the exemplary method 60 of FIG. 5. In another such embodiment, the processor-executable instructions 106 may be configured to implement a system for training an automated classifier to classify content items, such as the exemplary system 86 of FIG. 6. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 5 and the exemplary system 86 of FIG. 6) to confer individual and/or synergistic advantages upon such embodiments.

A first aspect that may vary among embodiments of these techniques relates to the scenarios wherein such techniques may be utilized. As a first example, these techniques may be applied to classify many types of content items 14 into one or more categories 16, using various properties of the data and metadata comprising the content items 14. As a first such example, the content items 14 may comprise a set of documents that may fall into various categories of literature, such as news items, scientific or technical reports, fictional or nonfictional stories, poetry, and reference documents, and/or may be written in one or more languages. As a second such example, the content items 14 may comprise a set of messages posted in a social network, a chat environment such as instant messaging or a Simple Message Service (SMS) conversation, an email conversation, a thread of conversation in a web forum or newsgroup, etc., where such messages discuss one or more topics, such as particular individuals, organizations, locations, events, or concepts. As a third such example, the content items 14 may comprise a set of images may depict various objects that may be identified according to various machine vision algorithms, such that the images may be classified into categories 16 according to various properties of the identified objects (e.g., based on biometric measurements that may identify particular individuals). As a fourth such example, the content items 14 may comprise a set of musical recordings to be classified into one or more musical genres (e.g., based on tempo, time signature, identified instruments, and musical structure).

As a second example of this first aspect, individuals may be utilized as human classifiers 20 through many types of arrangements. As a first such example, the individuals may comprise employees or volunteers having a formal relationship with a company, organization, or group endeavoring to classify the content items 14. As a second such example, the individuals may comprise agents who agree to classify content items 14 in exchange for a reward, such as a cash payment, credit that may be utilized to acquire goods or services, or a bartered exchange of services. As a third such example, the individuals may comprise visitors who simply wish to browse the content set 12; e.g., a patron of a music collection may be permitted to download and retrieve a musical recording, but only if the patron agrees to perform a classification 18 of the musical recording into one or more musical genres. As a fourth such example, the individuals may comprise players in a game that involves the classification 18 of content items 14 (e.g., by awarding points for classifications 18 that are consistent with the classifications 18 of other users involving the same content items 14) As a fifth such example, the individuals may have no relationship with the content set 12 and may receive no reward, but may nevertheless be willing to classify the content items 14 (e.g., as part of a voluntary and/or humanitarian effort).

As a third example of this first aspect, many types of artificial classifiers 32 may be utilized to perform the automated classification 18 of the content items 14. As a first such example, the automated classifier 32 may comprise an automated neural network that incrementally adjusts the weights of various interconnections among its neurons until the output neurons are capable of generating a correct output (identifying one or more categories 16) for each content item 14 based on a set of characteristics provided to each input neuron. As a second such example, the automated classifier 32 may comprise a Bayesian network that iteratively evaluates the set of content items 14 in the training set 34 to identify, according to statistical analyses, the properties that classify each content item 14 differentially among two or more subsets of categories 16, and may develop a hierarchy of differentiating factors that correctly pigeonholes each content item 14 into one or more categories 16. As a third such example, the automated classifier 32 may comprise a genetic algorithm may generate a set of entities that logically classify the content items 14 of the training set 34, and may competitively test, compare, and breed (with mutations) the logical instructions comprising each entity for a consecutive set of generations, with an adaptive pressure that selects the most accurate entities in each generation, until an entity that is capable of correctly classifying the content items 14 of the training set 34 with an acceptable range of accuracy is identified. These and other "machine learning" techniques, including combinations of such techniques, may be trained and utilized as automated classifiers 32 of the content items 14 of the content set 12. Those of ordinary skill in the art may select many such scenarios wherein the techniques presented herein may be utilized.

A second aspect that may vary among embodiments of these techniques relates to the manner of selecting content items 14 to be classified by a human classifier 20. As a first example, in accordance with these techniques, the content items 14 for which the automated classifier 32 cannot generate a classification 18 with a suitably high classification confidence 52 are selected, since selecting content items 14 having a suitably high classification confidence 52 is not likely to result in a significant improvement in the automated classifier 32, and therefore is not an efficient use of the attention of the human classifier 20. However, additional criteria may be used to select such content items 14. As a first variation, such selections may involve a selection, for sending to human classifiers 20, of content items 14 having the lowest classification confidences 52 identified by the automated classifier 32. For example, the content items 14 may be ranked according to classification confidence 52, and a subset of a particular size (e.g., ten), comprising the content items 14 having the having the lowest classification confidences 52, may be selected for inclusion in the training set 34. As a second variation of this second aspect, the content items 14 may be presented to the human classifier 20 in various ways. As a first such example, for a content item 14 having a low classification confidence 52 for a particular category 16 (e.g., a content item 14 for which a particular category 16 is a "close call"), a human classifier 20 may be presented with the content item 14 and the category 16 and requested to specify whether the content item 14 is associated with the category 16. As a second such example, for a content item 14 having low classification confidences 52 for several or all categories 16 (e.g., a content item 14 that is generally difficult to classify), a human classifier 20 may be presented with the content item 14 and the entire set of categories 16 and requested to specify with which categories 16 the content item 14 is associated. As a third such example, for a category 16 for which many content items 14 have a low classification confidence 52 (e.g., a category 16 for which classification criteria are unavailable, inaccurate, or inconsistent), a human classifier 20 may be presented with the category 16 and several content items 14, and requested to select the content items 14 that are strongly associated (or strongly not associated) with the category 16. The formulation of these inquiries may serve to improve specific classification weaknesses of the automated classifier 32.

Figure 8:
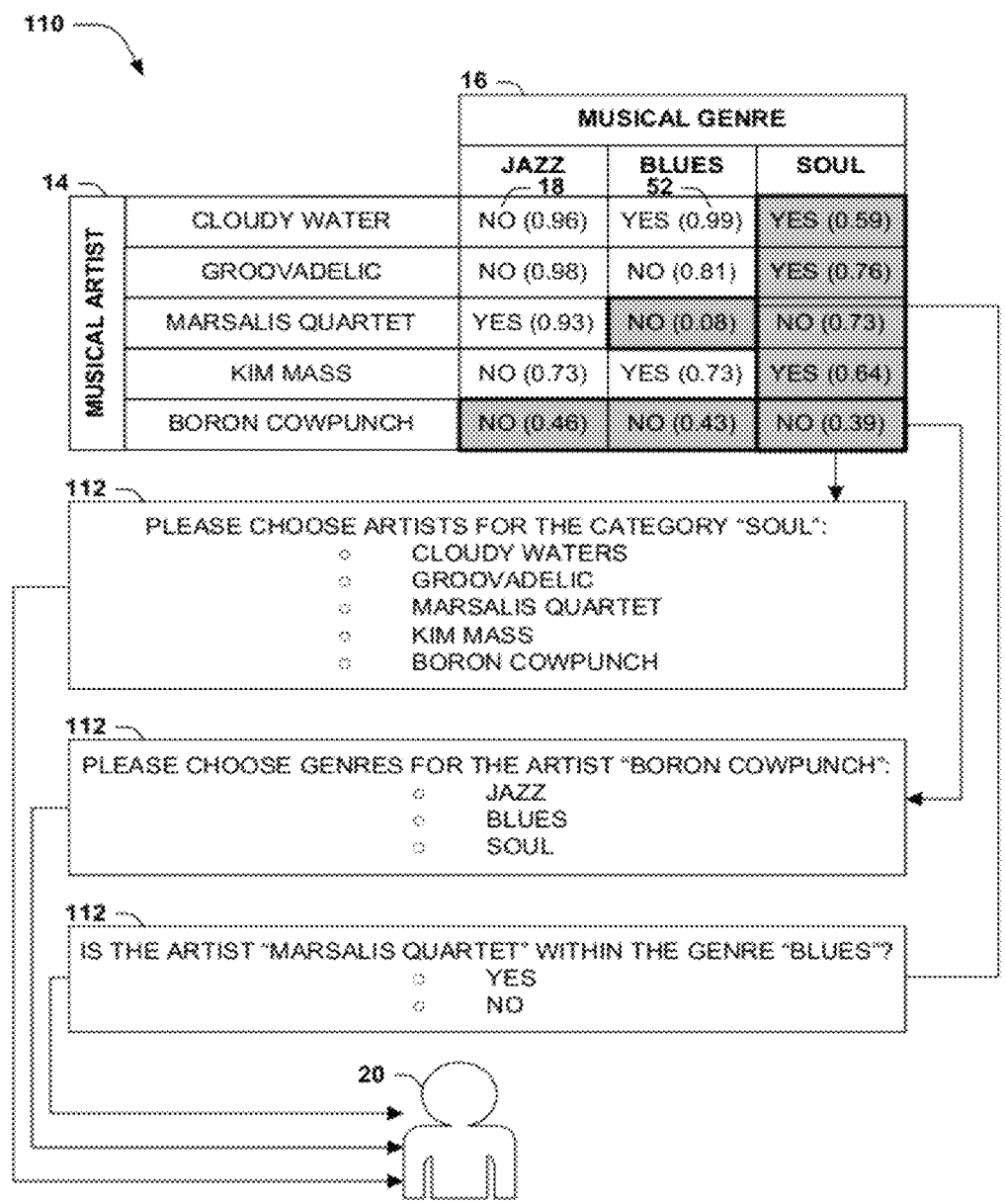
FIG. 8 is an illustration of an exemplary scenario featuring a selection of content items to be classified by a human classifier.

FIG. 8 presents an illustration of an exemplary scenario 110 featuring an classification 18 of content items 14 (comprising musical artists) according to one or more categories 16 (comprising musical genres), and a selection of content items 14 and categories 16 to be presented to a human classifier 20 in order to generate a training set 34 that may be useful for training the automated classifier 32 generating the classifications 18 with calculated classification confidences 52. As a first example, for a particular category 16, the automated classifier 32 may be unable to classify content items 14 with a high classification confidence 52; e.g., the content items 14 provided in a training set 34 may have had few or inconsistent associations with this category 16, and/or the automated classifier 32 may have settled upon classification criteria for this category 16 that were sufficient for the content items 14 of the training set 34 but that were not highly accurate. Accordingly, for this category 16, a first classification query 112 may be generated and presented to a human classifier 20, where such classification query 112 requests the human classifier 20 to select the content items 14 that are strongly associated with the category 16.

Conversely and as a second example illustrated in the exemplary scenario 110 of FIG. 8, for a particular content item 14, the automated classifier 32 may be unable to classify the content item 14 into any of the categories 16 with a high classification confidence 52; e.g., the content item 14 may be highly dissimilar to the content items 14 included in the training set 34 (such as "content item B" in the exemplary scenario 40 of FIG. 3), and/or may fall within the borders of several categories 16 (such as "content item C" in the exemplary scenario 40 of FIG. 3). Accordingly, for this content item 14, a second classification query 112 may be generated and presented to a human classifier 20, where such classification query 112 requests the human classifier 20 to select the categories 16 that are associated with the content item 14.

As a third example illustrated in the exemplary scenario 110 of FIG. 8, a particular classification of a content item 14 with a particular category 16 may be very low (e.g., a "close call," where the classification confidence 52 is close to zero), and may be particularly indicative of a specific classification 18 for which a human classification 20 may be particularly differentially diagnostic. Accordingly, for this content item 14 and category 16, a third classification query 112 may be generated and presented to a human classifier 20, where such classification query 112 specifically requests the human classifier 20 to indicate whether the content item 14 is associated with the category 16. By formulating classification queries 112 targeted in this manner, an embodiment may selectively apply the attention of the human classifier 20 to specific types of classification weaknesses of the automated classifier 32. Those of ordinary skill in the art may devise many ways of selecting among the content items 14 while implementing the techniques presented herein.

A third aspect that may vary among embodiments of these techniques relates to the manner of, after receiving from a human classifier 20 a set of one or more categories 16 associated with a content item 14, applying the associations identified by the human classifier 20. As a first variation, the automated classifier 32 may be configured to associate respective content items 14 with respective categories 16 having a classification degree (e.g., not just a "yes" or "no" binary classification, but a degree, such as "this content item 14 is associated 100% with a first category 16, but only 50% with a second category 16." It may be appreciated that the classification degree is semantically different than the classification confidence 52 (e.g., by comparing the statements: "I am 100% certain that this content item 14 is associated with a degree of 50% to this category 16," and "I am only 50% certain that this content item 14 is 100% associated with this category 16.") It may be recognized that such degree-based associations are utilized in the field of fuzzy logic, and reference to this field may facilitate an understanding of this variation. In scenarios where "fuzzy" classifications 18 are permitted, the classification 18 of content items 14 with categories 16 by a human classifier 20 may be utilized in many ways. For example, the content items 14 may be sent for a binary determination by several human classifiers 20, and an association may be established based on the results of such classification 18 in view of the percentages of the binary determinations (e.g., if, for a particular content item 14, six human classifiers 20 select a particular category 16 but three other human classifiers 2 do not, the content item 14 may be associated with the category 16 with a classification degree of 66%). Alternatively or additionally, the classifications 18 received from two or more human classifiers 20 of a content item 14 with a particular category 16 may only be included in the training set 34 if a sufficient consensus is achieved among the human classifiers 20; e.g., an embodiment may associate the content item 14 in the training set 34 with the category 16 only if the at least two human classifiers agree on such classification 18. This variation may restrict the contents of the training set 34 to classifications 18 that are consistently and objectively identified by the human classifiers 20. Those of ordinary skill in the art may devise many ways of applying the associations identified by the human classifiers 20 of content items 14 with categories 16 while implementing the techniques presented herein.

A fourth aspect that may vary among embodiments of these techniques relates to the manner of encouraging the involvement of human classifiers 20 in the classification 18 of content items 14 in order to improve the automated classifier 32. In some scenarios, no such encouragement may be involved; e.g., the human classifier 20 may be a developer or administrator of the automated classifier 32, such as an employee of a group utilizing the automated classifier 32, or a volunteer who participates for philosophical reasons. However, in other scenarios, it may be desirable to encourage the participation of human classifiers 20 (or to improve the accuracy of such classifications 18) by providing a reward to a human classifier 20 for classifying content items 14 within categories 16. As a first variation of this fourth aspect, the reward may comprise may types of compensation, such as a cash payment, credit for goods or services, or a bartered exchange (e.g., the human classifier 20 may wish to access a particular website, and may be granted access to the website in exchange for classifying content items). For example, a user may wish to examine the content items 14 of the content set 12 offered by a server (e.g., a collection of musical recordings). In exchange for performing classifications 18 of the content items 14 of the content set 12 (e.g., classifying the musical recordings into musical genres), the server may permit the user to examine, preview, and/or download the content items 14.

As a second variation of this fourth aspect, a reward presented to a human classifier 20 in exchange for classifying a particular content item 14 may be calculated in various ways. In some scenarios, identical or equivalent rewards may be presented for classifying content items 14. Alternatively, the reward presented for classifying a first content item 14 may differ from a reward presented for classifying a second content item 14 for various reasons. As a first example, respective human classifiers 20 may have a human classifier rating, e.g., a predicted proficiency or accuracy with which different human classifiers 20 classify the same content item 20 (based, e.g., on experience, qualifications, or past history of evaluations), and the reward presented for classifying a particular content item 14 to a human classifier 20 having a higher human classifier rating may be larger than for a human classifier 20 having a lower human classifier rating. As a second example, the reward may be calculated proportionally to a training value of the content item 14 in the training set 34 (e.g., to the predicted magnitude of improvement of the automated classifier 34 by having an accurate classification 18 of the content item 14 in the training set 34). For example, in the exemplary scenario 110 of FIG. 8, a comparatively high training value may be attributed to the classification 18 of the musical artist named "Boron Cowpunch" with the musical genre named "Soul," since such classification 18 may improve the accuracy of the automated classifier 32 both in classifying other content items 14 in the category 16 of "Soul" and in classifying other categories 16 for this content item 14. As a third example, the reward may be calculated inversely proportionally to the classification confidence 52 of the content item 14 identified by the automated classifier 32; for example, the classifications 18 for which the automated classifier 32 is least confident (e.g., the "close call" cases) may yield significantly useful information about such classifications 18, so a comparatively large reward may be provided to encourage the accurate classification 18 by human classifiers 20. As a fourth example, the reward may be calculated proportionally to a classification complexity of the content item 14. For example, classifying a brief document written in a simple language may be comparatively easy, while classifying a lengthy document written in a complicated language (such as a technical document) may be comparatively difficult, and rewards of different magnitudes may be accordingly calculated and provided. Many such factors, as well as various mechanics of supply and demand (e.g., the comparative scarcity or abundance of human classifiers 20 available to review a particular content item 14) may be evaluated in the calculation of the reward to be presented for such classification 18.

As a third variation of this fourth aspect, the selection of content items 14 may be adjusted in view of the costs in providing associated rewards to the human classifiers 20. The rewards provided in the reward system may entail a significant cost for the administrators of the automated classifier 32, and this cost may be reduced through particular variations. As a first example, it may be desirable to select content items 14 for classification 18 by human classifiers 20 that have comparatively small rewards. For example, when considering whether to select a comparatively easy-to-classify content item 18 or a comparatively difficult-to-classify content item 18 to a human classifier 20, it may be desirable to send the easier-to-classify content item 18 in order to reduce the cost of the associated reward, even if the difficult-to-classify content item 18 may be of marginally higher training value. Conversely, it may be desirable to select content items 14 for classification 18 by human classifiers 20 that have comparatively large rewards, if such rewards are of greater training value and may achieve greater improvement in the automated classifier 32. For example, instead of selecting a large number of content items 18 having small rewards due to a limited training value, it may be more advantageous to select a small number of content items 18 having large rewards due to having large training value, and in providing large rewards in order to encourage human classifiers 20 to provide highly accurate classification 18 thereof.

As a second example of this third variation, the rewards offered for training the automated classifier 32 may be restricted to a reward limit (e.g., a training budget) in order to assign a cap to the costs of the training. Therefore, an embodiment of these techniques may be configured to select, for sending to human classifier 20, a set of content items 18 for which the reward total, comprising the sum of the rewards offered to such human classifiers 20 for classifying such content items 18, does not exceed the reward limit. Additionally, if rewards are correlated with training values and the predicted magnitude of improvement of the automated classifier 32, it may be advantageous, e.g., to select content items 18 that maximally utilize the reward limit (e.g., the training budget) in order to achieve the greatest improvement within the training budget.

Figure 9:
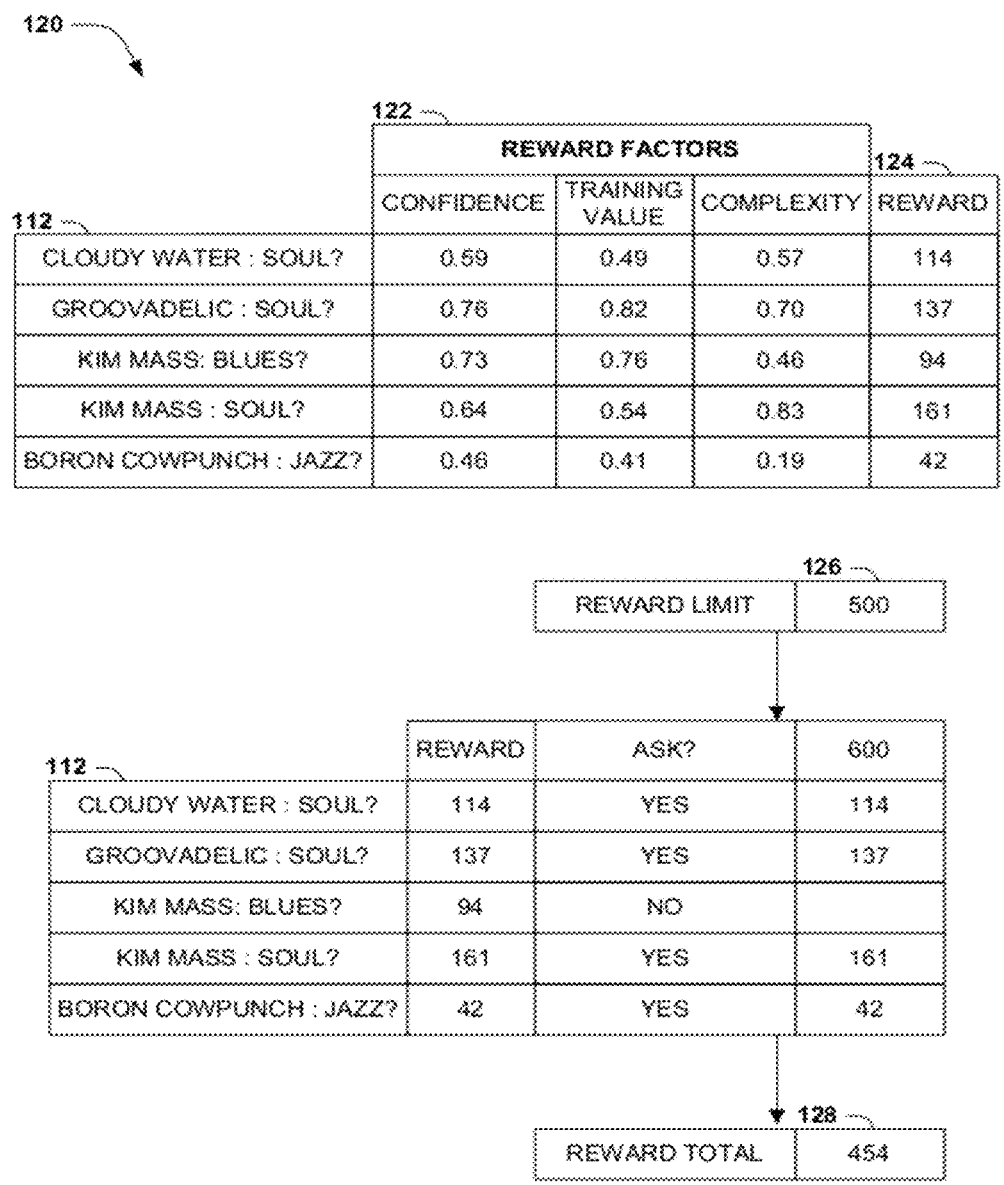
FIG. 9 is an illustration of an exemplary scenario featuring a calculation of rewards offered for the human classification of various content items based on respective reward factors and a selection of content items in view of a reward limit.

FIG. 9 presents an illustration of an exemplary scenario 120 featuring a calculation of rewards 124 to be provided to a human classifier 20 in exchange for classifying respective content items 12. (The numerical values of these rewards are not necessarily directly related with the award, e.g., as a sum of money, but may represent relative proportions in the sizes of the rewards.) Rewards 124 for respective classification queries 112 may be calculated based on one or more reward factors 122 associated with various considerations. For example, the rewards 124 may be calculated inversely proportionally to the calculation confidence 52 of a content item 14 with a category 16; directly proportionally to the training value represented by the inclusion of the content item 14 in the training set 34; and directly proportionally to the classification complexity of the content item 14. Rewards 124 calculated based on these reward factors 122 may be offered to human classifiers 20 in order to encourage participation in the classification 18 of the content item 14 of the training set 34. Moreover, content items 14 may be selected for inclusion in the training set 34 such that the reward total 128 of the rewards 124 does not exceed a reward limit 126 (e.g., a budget cap determined for the training 36 of the automated classifier 32). For example, if the rewards 124 are proportional with the training values of including the content items 14 in the training set 34, then it may be advantageous to choose the combination of content items 14 having rewards 124 having a reward total 128 that is nearest, but not exceeding, the reward limit 126. Those of ordinary skill in the art may devise many ways of calculating and distributing rewards 124 to human classifiers 20 in accordance with the techniques presented herein.

A fifth aspect that may vary among embodiments of these techniques relates to the algorithm utilized to implement the techniques presented herein. While the other variations discussed herein may relate to the substantive effects of such variations of these techniques, it may be appreciated that some algorithms selected for implementing these techniques may present advantages with respect to other algorithms.

As a first variation of this fifth aspect, an embodiment of these techniques may be configured to utilize a naïve automated classifier 32, such as an uninitialized or randomly seeded artificial neural network, and the involvement of the human classifier 20 may be utilized for the initial training 36 of the automated classifier 32 as well as supplemental training 36. Alternatively, an embodiment of these techniques may be configured to initialize the automated classifier 32 to select at least one category 16 for respective content items 14, e.g., by performing an initial training 36 using a pregenerated training set 34 before involving a human classifier 20.

As a second variation of this fifth aspect, the selection of content items 14 for a training set 34 to be sent to one or more human classifiers 20 may occur in various ways. As a first such example, upon identifying a content item 14 having a classification confidence 52 below a classification confidence threshold 54, an embodiment of these techniques may retrain the automated classifier 32 using the content item 14. Alternatively, a set of such content items 14 may be identified (e.g., for a portion or an entirety of the content set 12, such as when the training set 34 reaches a particular training set size), and used together to retrain the automated classifier 32. Additionally, these content items 14 may be combined with content items 14 from previous trainings 36 of the automated classifier 32 (e.g., along with the content items 14 from an initial training 36 and any previous supplemental training 36) in order to ensure that the retraining does not cause the automated classifier 32 to diverge from the initial training set 34. Alternatively, an embodiment of these techniques may be configured to initialize the training set 34 prior to adding the content items 14, and to reinitialize the training set 34 after the training 36. This variation may lead to a sequence of trainings 36 using different content items 14, which may reduce a deleterious effect of inconsistent or inaccurate content items 14 that may have been present in previous training sets 34.

As a third variation of this fifth aspect, the selection of content items 14 for a training set 34 may be performed once or on an iterative basis, where the iterations may continue indefinitely (e.g., whenever areas of classification weakness of the automated classifier 34 are identified), or until a desired classification confidence 52 is achieved. For example, after training 36 the automated classifier 32, an embodiment of these techniques may calculate a classification confidence 52 for the automated classifier 32 (e.g., the average of the classification confidence 52 for all content items 14 and/or categories 16), and may compare the classification confidence 52 of the automated classifier 32 with a classification confidence threshold 54 (e.g., a desired accuracy or proficiency of the automated classifier 52). If the classification confidence 52 is not below the classification confidence threshold 54, then additional content items 14 may be identified, and a retraining of the automated classifier 32 with a training set 34 comprising the additional content items 14 may be performed.

FIG. 10 presents an exemplary algorithm 130 that may be utilized to implement the training 36 of an automated classifier 32 according to the techniques presented herein. This exemplary algorithm 130 begins with an initialization of the automated classifier 32 to generate binary classifications 18 of content items 14 associated with respective categories 16. A loop may then begin, wherein a training set 34 is initialized, and the automated classifier 32 (e.g., the function PC(F(I,C))) may be invoked to classify respective content items 14 with categories 16 having a particular classification confidence 52. Content items 14 having a classification confidence 52 for a particular category 16 that is below the classification confidence threshold 54 may be added to the training set 34, and a reward limit 126 (such as a training budget) may be reduced by the reward 124 that may be provided to a human classifier 20 for classifying 18 the content item 14. When the size of the training set 34 reaches a training set size, the training set 34 may be sent to one or more human classifiers 20, and the classifications 18 of content items 14 with categories 16 by the human classifiers 20 may be utilized to retrain the automated classifier 32. A classification confidence 52 for the automated classifier 32 may then be performed, and while the classification confidence 52 remains above a classification confidence threshold 54 (e.g., the desired accuracy or proficiency of the automated classifier 20), additional iterations of the loop may be performed. In this manner, the exemplary algorithm 130 may be utilized to achieve the hybrid classification scheme involving both an automated classifier 32 and human classifiers 20 (while conservatively utilizing the latter to train the former) in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
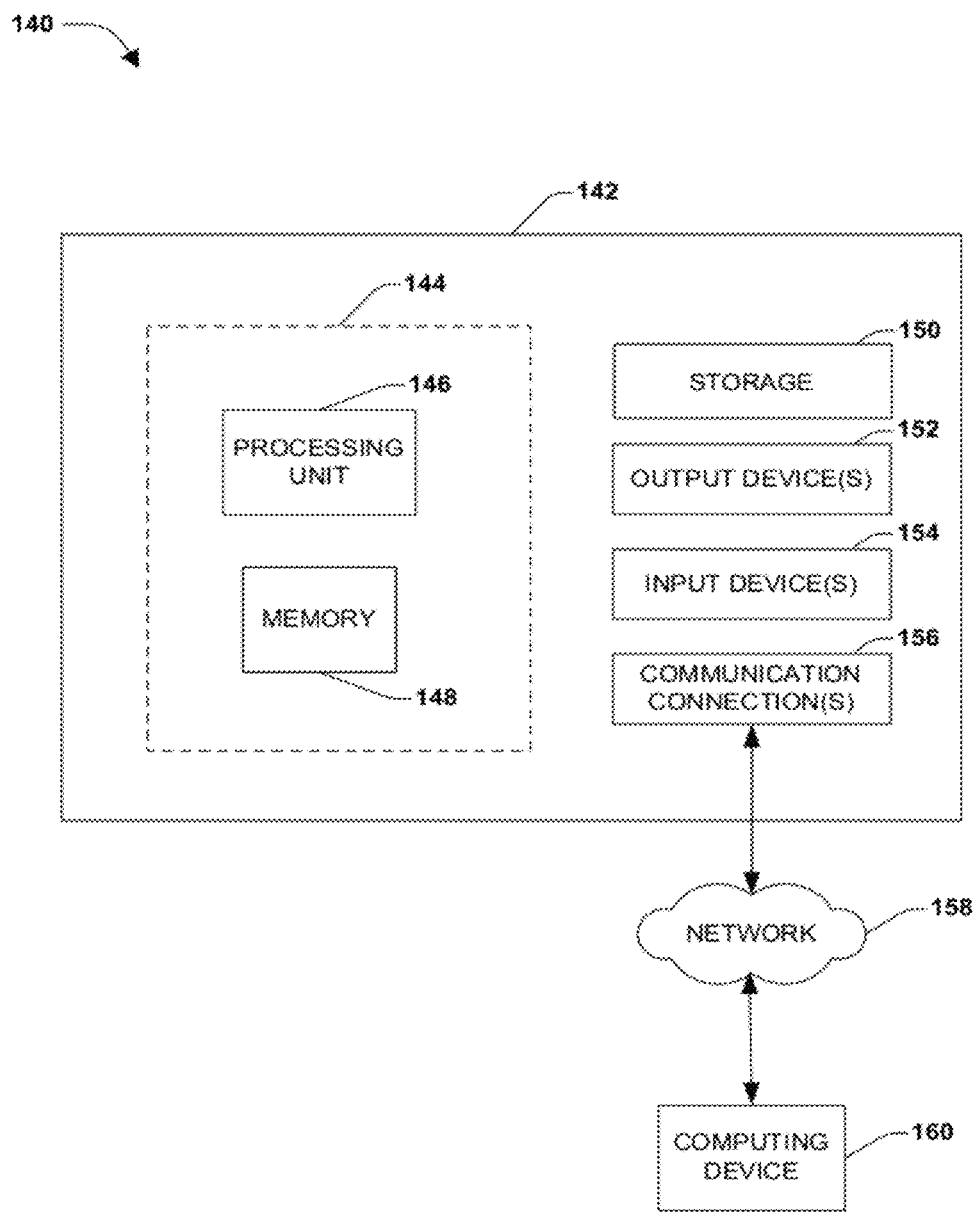
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 11 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 11 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of training an automated classifier to identify topical categories of content items of a content set using a device comprising a processor and having access to at least one human classifier, the method comprising:
executing on the processor instructions configured to:
for respective content items of the content set:
using the automated classifier, identify at least one topical category for the content item with a classification confidence;
for respective content items having a classification confidence for a selected topical category that is below a classification confidence threshold:
send the content item to a human classifier including the selected topical category into which the content item has been classified, and
upon receiving from the human classifier at least one user-selected topical category associated with the content item, store the content item in a training set associated with the at least one user-selected topical category; and
train the automated classifier using the training set.

2. The method of claim 1, the method comprising: from the content items having a classification confidence below the classification confidence threshold, selecting for sending to human classifiers the content items having the lowest classification confidences identified by the automated classifier.

3. The method of claim 1:
the classification confidence computed for respective topical categories;
the instructions further configured to, for respective topical categories, calculate an aggregate classification confidence of the content items associated with the topical category; and
sending content items to the human classifier comprising: for a selected topical categories having an aggregate classification confidence below a classification confidence threshold, sending at least one of the content items classified with the selected topical category to the human classifier.

4. The method of claim 1:
the automated classifier configured to associate respective content items with respective topical categories having a classification degree; and
the instructions configured to, upon receiving from at least one human classifier at least one topical category associated with the content item, associate the content item in the training set with at least one topical category having a classification degree calculated proportionally to the at least one human classifier associating the content item with the topical category.

5. The method of claim 1:
the device having access to at least two human classifiers; and
the instructions configured to:
send content items having a classification confidence below the classification confidence threshold to at least two human classifiers; and
upon receiving from the at least two human classifier at least one topical category associated with the content item, associate the content item in the training set with at least one topical category associated with the content item by the at least two human classifiers.

6. The method of claim 1, the instructions configured to, upon receiving the at least one topical category associated with the content item from the human classifier, deliver a reward to the human classifier.

7. The method of claim 6, the training set comprising:
a first content item associated with a first reward, and
a second content item associated with a second reward that is different from the first reward.

8. The method of claim 7:
respective human classifiers having a human classifier rating; and
the reward delivered to a human classifier calculated proportionally to the human classifier rating of the human classifier.

9. The method of claim 7, the reward associated with a content item calculated proportionally to a training value of the content item in the training set.

10. The method of claim 7, the reward calculated inversely proportionally to the classification confidence of the content item identified by the automated classifier.

11. The method of claim 7, the reward associated with a content item calculated proportionally to a classification complexity of the content item.

12. The method of claim 7, selecting the content items comprising: from the content items having a classification confidence below the classification confidence threshold, selecting the content items associated with the smallest rewards.

13. The method of claim 6:
the device defining a reward limit of rewards provided to human classifiers; and
the method comprising: selecting for sending to human classifiers the content items associated with rewards having a reward total not exceeding the reward limit.

14. The method of claim 1, the instructions configured to initialize the automated classifier to select at least one topical category for respective content items.

15. The method of claim 1:
the instructions configured to initialize the training set;
identifying the content item comprising: upon identifying the content item, adding the content item to the training set; and
sending the content item to a human classifier comprising: upon the training set reaching a training set size, sending respective content items of the training set to a human classifier.

16. The method of claim 1, training the automated classifier comprising:
training the automated classifier using the training set; and
after training the automated classifier:
calculating a classification confidence for the automated classifier; and
while the classification confidence is below the classification confidence threshold:
identifying additional content items having a classification confidence below the classification confidence threshold, and
retraining the training set using the additional content items.

17. The method of claim 16, training the automated classifier comprising: after training the automated classifier using the training set, reinitializing the training set.

18. The method of claim 1:
at least one content item having a classification confidence below a classification confidence threshold for at least two topical categories; and
sending the content item to a human classifier further comprising:
informing the human classifier of the at least two topical categories with which the content item has been classified; and
requesting the human classifier to select at least one of the topical categories with which the content item is to be classified.

19. A system configured to train an automated classifier to identify topical categories of content items of a content set using a device comprising a memory and a processor and having access to at least one human classifier, the system comprising:
a content item selecting component comprising instructions stored in the memory that, when executed on the processor, cause the device to, for respective content items of the content set, using the automated classifier, identify at least one topical category for the content item with a classification confidence;
a training set generating component comprising instructions stored in the memory that, when executed on the processor, cause the device to:
for respective topical categories, calculate an aggregate classification confidence of the content items associated with the topical category;
for a selected topical category having an aggregate classification confidence below a classification confidence threshold:
send at least one of the content items classified with the selected topical category to the human classifier; and
upon receiving from the human classifier at least one human-classified topical category associated with the content item, store the content item in a training set associated with the at least one human-classified topical category; and
an automated classifier training component comprising instructions stored in the memory that, when executed on the processor, cause the device to train the automated classifier using the training set.

20. A computer-readable storage device comprising instructions that, when executed by a processor of a device comprising an automated classifier and having access to at least one human classifier, identify topical categories of content items of a content set by:
for respective content items of the content set:
using the automated classifier, identifying at least one topical category for the content item with a classification confidence;
for respective content items having a classification confidence for a selected topical category that is below a classification confidence threshold:
sending the content item to a human classifier including the selected topical category into which the content item has been classified, and
upon receiving from the human classifier at least one user-selected topical category associated with the content item, storing the content item in a training set associated with the at least one user-selected topical category; and
training the automated classifier using the training set.

* * * * *